United States Patent
Degenstein

(10) Patent No.: US 8,437,934 B2
(45) Date of Patent: May 7, 2013

(54) TEMPERATURE AND WEAR AND TEAR SENSOR FOR BRAKE OR CLUTCH DEVICES

(75) Inventor: Thomas Degenstein, Darmstadt (DE)

(73) Assignee: TMD Friction Services GmbH, Leverkusen (DE)

( * ) Notice: Subject to any disclaimer, the term of this patent is extended or adjusted under 35 U.S.C. 154(b) by 406 days.

(21) Appl. No.: 12/438,165

(22) PCT Filed: Aug. 18, 2007

(86) PCT No.: PCT/EP2007/007314
§ 371 (c)(1),
(2), (4) Date: Mar. 4, 2009

(87) PCT Pub. No.: WO2008/022754
PCT Pub. Date: Feb. 28, 2008

(65) Prior Publication Data
US 2010/0017087 A1   Jan. 21, 2010

(30) Foreign Application Priority Data
Aug. 23, 2006  (DE) .................. 10 2006 039 590

(51) Int. Cl.
*G06F 7/70*  (2006.01)

(52) U.S. Cl.
USPC ............. 701/70; 188/1.11 L; 188/1.11 R; 340/453; 374/E7.004

(58) Field of Classification Search .......... 701/70; 340/453, 454; 188/1.11 R, 1.11 W, 1.11 L, 188/1.11 E; 374/E7.004; 356/630; 136/211; 303/6.1; 73/121
See application file for complete search history.

(56) References Cited

U.S. PATENT DOCUMENTS

| | | | | |
|---|---|---|---|---|
| 1,957,051 | A | * | 5/1934 | Norton .......................... 374/135 |
| 3,674,114 | A | * | 7/1972 | Howard ................... 188/1.11 R |
| 4,520,661 | A | * | 6/1985 | Tamai et al. ..................... 73/129 |
| 4,790,606 | A | * | 12/1988 | Reinecke ....................... 303/191 |
| 4,824,260 | A | * | 4/1989 | Novotny et al. .............. 374/179 |
| 5,559,286 | A | * | 9/1996 | White et al. ..................... 73/129 |

(Continued)

FOREIGN PATENT DOCUMENTS

| | | |
|---|---|---|
| DE | 2002379 | 8/1970 |
| DE | 7838521 | 3/1979 |

(Continued)

OTHER PUBLICATIONS

"Fahrwerktechnik, Bremsdynamik and Pkw-Bremsanlagen"[Chassis engineering, brake dynamics and automotive brake systems] by Manfred Burckhardt and Jornsen Reimppel, published by Vogelverlag 1191, ISBN3802301846, p. 209.*

(Continued)

*Primary Examiner* — Thomas Black
*Assistant Examiner* — Shardul Patel
(74) *Attorney, Agent, or Firm* — Novak Druce Connolly Bove + Quigg LLP

(57) ABSTRACT

A temperature and/or wear sensor for brake or clutch devices is designed as a thermocouple in which the conductors (20, 22) that are electrically insulated from each other are arranged inside a friction lining (14) and can be connected to each other so as to be electrically conductive by means of a rotatably mounted brake element (12), clutch element or the like, with which the friction lining can be engaged in order to brake or to depress the clutch (FIG. 1). The conductors can be coupled to an electric oscillating circuit.

15 Claims, 1 Drawing Sheet

U.S. PATENT DOCUMENTS

| | | | | |
|---|---|---|---|---|
| 5,651,431 | A | * | 7/1997 | Kyrtsos .................... 188/1.11 L |
| 5,939,978 | A | * | 8/1999 | Kyrtsos ........................ 340/454 |
| 6,250,429 | B1 | * | 6/2001 | Kramer .................... 188/1.11 L |
| 7,523,811 | B2 | * | 4/2009 | Pacchiana et al. ...... 188/1.11 W |
| 2005/0039992 | A1 | * | 2/2005 | Hurwic ...................... 188/73.35 |
| 2005/0212357 | A1 | * | 9/2005 | Adams .................... 303/122.03 |
| 2006/0153276 | A1 | * | 7/2006 | Hartmann et al. ............ 374/172 |
| 2007/0152501 | A1 | * | 7/2007 | Eichner et al. ................ 303/191 |
| 2008/0007951 | A1 | * | 1/2008 | Chan ............................ 362/267 |

FOREIGN PATENT DOCUMENTS

| | | |
|---|---|---|
| DE | 3127302 | 1/1983 |
| DE | 3411332 | 10/1985 |
| DE | 4231107 | 3/1994 |
| DE | 19945205 | 3/2001 |
| EP | 0189082 | 7/1986 |
| EP | 0337919 | 10/1989 |

OTHER PUBLICATIONS

M. Bargende and R.G. Putter, Dynamische Temperaturmessung zwischen Bremsbelag und -scheibe wahrend des Bremsvorganges [Dynamic Temperature Measurement Between the Brake Lining and the Brak Disc During the Braking Operation], 1987, No. 632, pp. 282-299, VDI-Berichte [Reports of the Association of German Engineers].

Manfred Burckhardt and Jornsen Reimpell, Bremssattel und ihre konstruktiven Einzelheiten [Chassis Engineering, Brake Dynamics and Automotive Brake Systems], 1991, ISBN 3802301846, pp. 194-239, Vogelverlag.

* cited by examiner

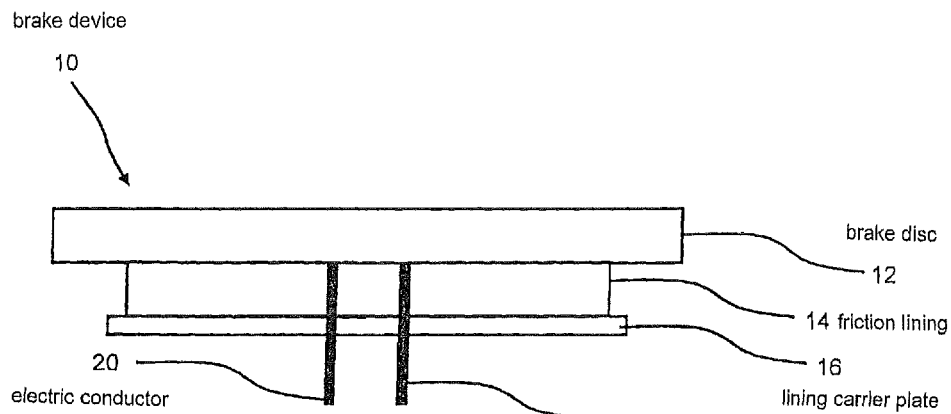
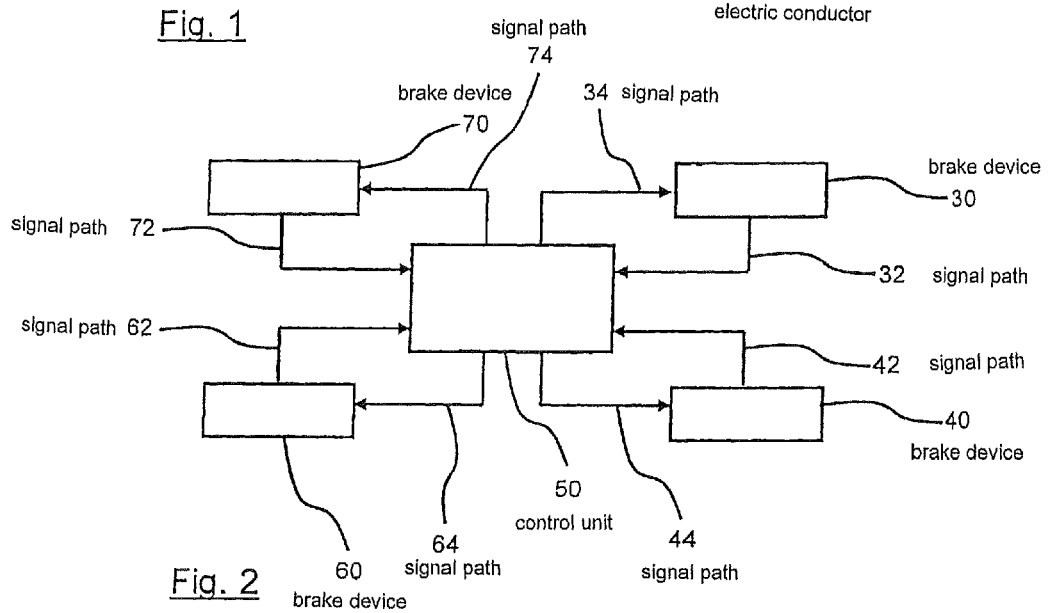

TEMPERATURE AND WEAR AND TEAR SENSOR FOR BRAKE OR CLUTCH DEVICES

CROSS-REFERENCE TO RELATED APPLICATIONS

This application is a national stage application (under 35 U.S.C. §371) of PCT/EP2007/007314, filed Aug. 18, 2007, which claims benefit of German application 10 2006 039 590.5, filed Aug. 23, 2006.

DESCRIPTION

The invention relates to a temperature sensor and a wear sensor for brake or clutch devices, particularly for automotive brakes or clutches. The invention further relates to a brake system equipped with such sensors, and to a method for controlling such a brake or clutch system.

STATE OF THE ART

Brakes such as, for instance, automotive brakes configured as disc brakes, sometimes warm up or heat up considerably during the braking operation. In this process, the brake components involved, such as the brake lining and the brake disc, can heat up to more than 100° C. [212° F.]. Especially in the case of several braking operations shortly one after the other, the high temperature that prevails at the brake means that the requisite braking performance can no longer be attained since the heat causes the friction value of the brake to decrease. This effect, which is also referred to as fading, is of great relevance in terms of the maximum braking action that can be achieved and also in terms of the reliability of the proper functioning of the brake.

The temperature of automotive brakes is often determined on the basis of estimation methods which, for instance, utilize an acceleration or deceleration profile as well as information about the vehicle weight so as to determine the energy that is converted from kinetic energy into friction energy during the braking operation. Such an energy balance allows conclusions to be drawn about the brake temperature.

Such estimation methods, however, are often not sufficiently precise. When it comes to a part that is extremely crucial for vehicle safety such as the vehicle brake, this situation constitutes a considerable drawback.

European patent application EP 0 337 919 B1 discloses a brake having a temperature-sensitive device that emits a signal that alternatively indicates the stationary temperature of the brake shoe-friction element and a transient temperature of the interface between the friction element and the brake drum. For this purpose, the temperature-sensitive device has an erodible metal plate that constitutes an element of a thermocouple measuring point that is attached to the brake shoe.

This metal plate is affixed to a side delimitation of the brake lining, and the electric signals are transmitted via exposed cables that are connected to the plate. Particularly these exposed cables, which are fed in from the outside, are very susceptible to damage. Moreover, the installation of the erodible metal plate on the side is very laborious and time-consuming during the production of a brake lining.

Moreover, German patent specification DE 31 27 302 C2 discloses a device to regulate the propulsion of motor vehicles in which the brake linings of the wheel brakes are provided with temperature sensors whose electric output signals are an indirect indicator of the brake disc temperature. The temperature sensors are installed in recesses in the brake linings provided for purposes of accommodating wear sensors, or else on the wear sensors themselves. These wear sensors can be configured as thermocouples. A wear indication signal is triggered if the electric connection is interrupted or if a body contact occurs via the brake disc.

The state of the art also describes surface thermocouples such as those disclosed, for example, in German patent application DE 34 11 332 A1.

Such surface thermocouples typically consist of two electric conductors that are made of different materials, that are electrically insulated with respect to each other and that run parallel to a surface measuring point. The two electric conductors end so as to be flush at the surface measuring point, thus forming a flat face that has a thin metallic coating that electrically connects the two conductors to each other.

Due to the thin metallic coating, such surface thermocouples exhibit an inherent inertia since, in order to measure a temperature, this thin metallic coating has to adapt completely to the temperature that is to be measured.

Moreover, such surface thermocouples are unsuitable for measuring the temperature of a brake since such an element would regularly be destroyed or its function would be impaired as a result of the natural wear of a friction lining.

The publication titled "Fahrwerktechnik, Bremsdynamik und Pkw-Bremsanlagen" [Chassis engineering, brake dynamics and automotive brake systems] by Manfred Burckhardt and Jörnsen Reimppel, published by Vogelverlag 1991, ISBN 3802301846, page 209, also discloses a surface thermocouple embedded in a friction lining, whereby the electric contact between the two thermowires is established by the brake disc itself when the latter is in contact with the friction lining during the braking operation.

Such a device is also described in the article titled "Dynamische Temperaturmessung zwischen Bremsbelag und-Scheibe während des Bremsvorgangs" [Dynamic temperature measurement between the brake lining and the brake disc during the braking operation] by M. Bargende and R. G. Pütter, VDI-Berichte [Reports of the Association of German Engineers] No. 632, 1987, pages 283 to 299.

All of the prior-art sensor devices in the clutch or brake sector have in common the fact that the temperature and wear have to be measured in each case by sensor elements individually provided for this purpose. The prior-art methods for measuring the wear of friction linings are also based only on the detection of a prescribed wear boundary. A gradual, continuous and quantitative determination of the brake-related or clutch-related wear is not possible with the devices currently known.

SUMMARY OF THE INVENTION

Task at Hand

Therefore, the present invention has the objective of allowing a reliable as well as cost-effective measurement of the temperature of a brake or clutch device, which also offers a high degree of accuracy.

It is also the objective of the invention to employ the improved and more exact temperature and wear sensors in order to provide a multifunctional brake or clutch system as well as a corresponding method to operate such a brake or clutch system.

THE INVENTION AND ITS ADVANTAGEOUS EFFECTS

The device according to a first embodiment of the invention is intended for detecting the temperature and/or wear of a brake or clutch device. In the case of the brake device, at least one friction lining is provided such as, for instance, a brake block or a brake lining as well as a rotatably mounted brake element such as, for example, a brake disc. The brake element and the friction lining can be frictionally engaged with each other in order to exert a braking effect during the braking operation.

During the braking operation, the friction surface of the friction lining and the friction surface of the brake element situated opposite from it come into contact, preferably over the entire surface of the friction lining, so that the greatest possible friction can be achieved between the friction lining and the brake element which, in turn, translates into a strong braking effect.

Typically, the friction lining can be moved in the axial direction relative to the rotatably mounted or rotating brake element, so that the braking or friction force between the brake element and the friction lining can be variably adjusted.

Inside the friction lining, there are at least two electric conductors that are made of different materials, that are insulated with respect to each other and that can be connected via the brake element so as to be electrically conductive and so as to form a thermocouple. Accordingly, the brake device has an inherent thermocouple whose individual components—namely, two electric conductors made of different materials and their electrically conductive connection—are arranged on different components of the brake device that interact mechanically with each other, namely the friction lining and the brake element, or else said components are accommodated therein.

Here, it is provided that the two electric conductors, which are preferably made of different alloyed materials or different metal alloys, end in a flat face, namely, the friction surface of the friction lining. There is no electric contact between the two electric conductors inside the friction lining. They are electrically insulated from each other inside the friction lining structure.

According to this embodiment of the invention, for purposes of forming the thermocouple, which requires an electric connection of the two conductors, a brake element, such as, for instance, a brake disc, is provided of which at least the friction surface that can be engaged with the friction lining consists of electrically conductive material or else it is coated with such a material having a certain minimum layer thickness.

In this manner, a thermocouple that is subject to wear is provided for a brake device and it remains completely operational, even at an advanced stage of wear. At the same time, according to this embodiment of the invention—in contrast to German patent application DE 34 11 332 A1—a direct temperature measurement is possible since the conductive connection between the two electric conductors of the thermocouple is established precisely by the component of the brake whose temperature is to be measured by means of the thermocouple according to this embodiment of the invention.

Unlike with conventional surface thermocouples, there is no need for a thermal adaptation of the thin metallic coating that electrically connects the two conductors. Consequently, the inertia of the thermocouple according to this embodiment of the invention is negligibly small.

In the same way, the electric signals that can be received via the two electric conductors provide information about the temperature of the friction surface of the friction lining. The thermocouple integrated into the friction pair, namely, the friction lining and the brake element, thus allows direct temperature measurement directly at the interface between the friction linings of the brake that rub against each other. The temperature can be measured directly at the place where the friction heat is generated during the braking operation.

This measurement takes place virtually completely independently of heat-conductive members or elements which, as is widespread in the state of the art, first have to conduct the heat generated at the interface between the friction lining and the brake element to a sensor located at a distance therefrom.

Preliminary experiments have shown that closing the thermocouples via the brake disc significantly shortens the response time of the sensor to the range of milliseconds. Consequently, temperature peaks and so-called hot spots, that is to say, spots on the brake disc, can be detected with the temperature sensor according to this embodiment of the invention.

Moreover, the device according to this embodiment of the invention can be realized relatively inexpensively and with just a few work steps. In fact, it is merely necessary to incorporate at least two electric conductors into the structure of the friction lining during its production. These two electric conductors are fed out of the friction lining preferably via the lining carrier plate and then connected to an evaluation or control unit provided for this purpose.

The other end of the two conductors is flush with the friction surface of the friction lining and makes electric contact with the brake element, for instance, the brake disc, during the braking operation.

Therefore, during the braking operation, even a rising temperature curve can be measured with virtually no time delay and, if the device is installed in a vehicle, this information can be transmitted to the driver or to the on-board electronic system.

In a corresponding manner, the sensor according to the invention for detecting the temperature and wear of the friction lining or clutch lining in clutch devices is replaceable.

It is especially provided that the two electric conductors can be coupled to an electric oscillating circuit so that it can be used to measure the wear of the friction lining. The length-dependent impedance of the two electric conductors provides direct information about their length and thus about the remaining thickness of the friction lining or clutch lining. In this manner, the degree of abrasion or wear of the friction lining can be measured continuously by means of the two electric conductors of the thermocouple.

Consequently, a universal device for detecting the temperature as well as the degree of wear of a friction lining is produced.

According to one advantageous embodiment of the invention, the at least two electric conductors or pairs of electric conductors run essentially parallel to each other inside the friction lining. This ensures that the distance between the two electric conductors does not change, even as the friction lining shows signs of wear. Therefore, the crucial thermocouple parameters for detecting the temperature remain essentially constant, even under continuous wear.

According to another preferred embodiment of the invention, it is provided that the at least two electric conductors run essentially parallel to the surface normal of the friction surface of the brake element or clutch element. In this embodiment, the faces of the ends of the electric conductors are flush with the friction surface of the friction lining or clutch lining, whose friction surface naturally runs parallel to the friction surface of the brake element in order to attain maximum braking action, or else it runs parallel to the friction surface of the clutch element in order to attain maximum frictional grip.

In particular, the vertical arrangement of the electric conductors of the thermocouple relative to the friction surfaces has the advantage that the distance along which the electric conductors have to be inserted through the friction lining is as short as possible.

Of course, as an alternative to the vertical arrangement of the electric conductors and the friction surfaces of the friction lining and brake element or clutch element, it is also possible to select an arrangement of the two electric conductors in which they run parallel to each other but obliquely relative to the surface normal of the friction surface. With such a configuration, the size of the cross-sectional surface of the electric conductors on the friction surface of the friction lining can be slightly enlarged, which can sometimes increase the sensitivity of the thermocouple.

According to another advantageous embodiment of the invention, for purposes of measuring a three-dimensional temperature distribution, it is provided that several pairs of electric conductors, each made of a different material, are installed at different places inside the friction lining. In this manner, the temperature can be detected and appropriately evaluated at different positions distributed over the friction surface of the friction lining. On the basis of this temperature distribution measured with three-dimensional resolution over the friction surface, conclusions can be drawn about the condition and the degree of wear of the friction lining.

According to another preferred embodiment, it is provided that the electric conductors arranged in the friction lining wear together with the friction lining. This ensures that the end of the two electric conductors facing the brake element or clutch element are always arranged in such a way that their faces are flush with the friction surface of the friction lining. The two electric conductors, which preferably run perpendicular to the carrier plate and perpendicular to the friction surfaces of the brake or clutch elements, allow the temperature and degree of wear to be measured and detected precisely and reliably, even despite considerable wear.

According to another independent aspect, there is provided a brake system having at least one brake device or a clutch system having a clutch device comprising at least one device for detecting the temperature and/or wear of the brake or clutch device. Furthermore, a control unit for detecting the operating state of each brake device is provided for the brake system, said control unit being configured to individually adjust the braking parameters for each brake device as a function of the operating state ascertained in each case.

Such a brake system is intended especially for vehicles having several individual brake devices that are arranged, for example, on each of the four wheels. Signals from a separate sensor-based detection of the temperature of the brake components and/or of the degree of wear that might have occurred are transmitted to the control unit. Depending on the temperatures and/or degrees of wear that have been ascertained, the individual brake devices can be actuated individually so that ultimately, they are stressed as uniformly as possible and thus wear as evenly as possible.

If, for instance, it is ascertained that one or even two of the brake devices exhibit an elevated temperature, it can be provided that the braking pressure on these brake devices is reduced while the braking pressure on the remaining brake devices that are at a lower temperature is correspondingly increased on an as-needed basis.

Owing to the separate determination of the temperature that is actually present at the various brakes of a vehicle, the distribution of the braking force of the vehicle can be adjusted in such a way that the colder brake is subjected to greater stress, thereby relieving the hot or heated-up brakes. In this manner, the overall braking effect on the vehicle can be optimized.

According to a refinement, it is particularly provided that the operating state of a brake device encompasses at least the temperature and/or the degree of wear of the friction lining and/or of a brake element such as, for example, a brake disc. The brake parameters, here especially the braking pressure, are determined individually for each vehicle brake and as a function of the previously ascertained operating state parameters, namely, the current temperature and/or the degree of wear of a friction lining or brake disc.

According to another refinement, it is provided that the control unit of the brake system is configured to regulate or to set a maximum braking pressure that can be applied and/or it is configured to set an air space between the friction lining and the brake element. Such a control mechanism is intended particularly for brake devices that are activated electrohydraulically.

Thus, the thermocouple formed by the brake element and the friction lining can be used not only to determine the temperature and/or wear of a friction lining, but also as a signal emitter to indicate whether there is mechanical contact between the brake disc and the friction lining. Thus, the wear and temperature sensor can also function as a contactor to rub the brake discs dry by carefully moving the friction linings towards the brake disc, for example, if the road surface is wet because of rain. This preventive measure averts any decrease in the braking action, even if the brake discs are wet.

According to another independent aspect, a method for controlling a brake system is disclosed, whereby first of all, the wear of at least one friction lining of a brake device is ascertained and/or the temperature of at least one brake device is ascertained by means of the sensor according to the invention. Subsequently, as a function of the ascertained operating state parameters, preferably the wear and/or the temperature, individual brake parameters such as, for example, the braking pressure or the positioning of the friction linings, are ascertained. Finally, the individual brake devices are activated and/or, if necessary, appropriately actuated as a function of the brake parameters that have been determined individually for each brake device.

The wear is preferably measured at the beginning of the operation if—presupposing a defined standstill time—it can be assumed that the brake or clutch device is cold. Such a measurement yields a sort of reference value that can be utilized to adjust values that were determined under exposure to heat. Such a cold measurement thus allows an adequate calibration of the brake system or of the wear and temperature sensors.

The temperature or wear sensors are especially intended for brakes in motor vehicles, but in addition to a brake system based thereon, they can also be used in other areas of application for brake devices in general, for instance, for printing presses or for any type of clutch devices.

DESCRIPTION OF THE DRAWINGS

Additional objectives, features as well as advantageous application possibilities will be explained on the basis of the description below of embodiments making reference to the drawings. Here, all of the described and/or illustrated features, in any meaningful combination, constitute the subject matter of the invention, also irrespective of the claims or of their referral back to other claims.

The following is shown:

FIG. 1—a schematic cross-sectional depiction through a brake device with a combined wear and temperature sensor, and FIG. 2—a schematic block diagram of a brake system having a total of four brake devices and one control unit.

DESCRIPTION OF THE PREFERRED EMBODIMENTS

The brake device 10 according to FIG. 1 has a rotatably mounted brake disc 12 and a friction lining 14 that can be engaged with the brake disc 12, said friction lining 14, in turn, being arranged on a lining carrier plate 16. For purposes of exerting a braking action, the brake lining consisting of the lining carrier plate 16 and the friction lining 14 is pressed from the top against the rotating brake disc 12 so that the flat friction surfaces of the brake disc 12 and the friction lining 14 rub against each other in order to bring about the friction force necessary for the braking.

Two electric conductors 20, 22 are fed from the rear—in the depiction according to FIG. 1 from below—through the brake lining 14. The faces of these electric conductors 20, 22, which are made of different materials, are flush with the friction surface of the friction lining 14. The two electric conductors 20, 22 form a thermocouple together with the brake disc 12—which is configured to be electrically conductive or which is at least adequately coated with a conductive material.

The two electric conductors 20, 22 are made of different materials, for instance, different metals or different metal alloys or the like. Inside the friction lining 14 as well as in the area of the passage through the lining carrier plate 16, the two conductors 20, 22 are electrically insulated from each other. A conductive connection between them is ultimately established only for the friction layer of the brake disc 12.

The electric contact between the two electric conductors 20, 22 is established especially when the brake device 10 is actuated and the friction lining 14 frictionally engages with the brake disc 12.

The two electric conductors 20, 22 not only form a thermocouple but can also be used to determine the thickness of the friction layer 14 when they are contacted with an electric oscillating circuit. By means of an electric oscillating circuit (not shown explicitly here), the impedance of the two electric conductors 20, 22 can be determined, which provides information about the length of the electric conductors 20, 22, which wear together with the friction lining 14, thus also allowing conclusions to be drawn about the remaining lining thickness.

In this manner, both the temperature and the wear of the brake components 12, 14 in this type of brake device 10 can be determined continuously, precisely and cost-effectively with simple means. Moreover, the temperature and wear measurement of the abrasion or wear of a friction lining 14 is hardly affected. The temperature sensor as well as the wear sensor remain completely intact until a minimum permissible lining thickness is reached.

FIG. 2 shows a block diagram of a brake system comprising a total of four brake devices 30, 40, 60, 70. Such a brake system is intended, for example, for a four-wheel vehicle. The brake devices 30, 40, 60, 70, each individually intended for one wheel, are electrically connected to a central control unit 50. Temperature and wear signals of the appertaining brake devices 30, 40, 60, 70 are transmitted via signal paths 32, 42, 62, 72 to the control unit 50. On the basis of the acquired measuring data, the unit 60 can now determine different brake parameters that are coordinated with the individual brake devices 30, 40, 60, 70 for purposes of evenly distributing the stress on the brakes, said brake parameters being transmitted to the individual brake devices 30, 40, 60, 70 via the signal paths 34, 44, 64, 74.

Preferably, the individual brake devices 30, 40, 60, 70 can be actuated and controlled separately so that they can be actuated as a function of their wear or stress degree. The control unit 50 can be integrated, for example, into an ESP control system so that the braking pressure can be adjusted as a function of the brake temperature or brake stress. This reduces safety-critical brake fading.

The objective of this actuation is also to achieve that all vehicle brakes heat up uniformly depending on their design, as a result of which it is possible to delay or even prevent the failure of individual brake devices. For example, brakes that are subjected to especially severe stress, can have longer time intervals for cooling down. Moreover, it is possible that equalizing and uniformly distributing the brake stress and the brake wear can also effectively suppress brake squeaking, so that ultimately greater braking comfort is achieved.

While preferred embodiments of the invention have been described and illustrated here, various changes, substitutions and modifications to the described embodiments will become apparent to those of ordinary skill in the art without thereby departing from the scope and spirit of the invention.

List of Reference Numerals
10 brake device
12 brake disc
14 friction lining
16 lining carrier plate
20 electric conductor
22 electric conductor
30 brake device
32 signal path
34 signal path
40 brake device
42 signal path
44 signal path
50 control unit
60 brake device
62 signal path
64 signal path
70 brake device
72 signal path
74 signal path

The invention claimed is:

1. A device for detecting the temperature and/or wear of a brake (10) or clutch device, comprising:
    at least one friction lining (14) frictionally engageable with a rotatably mounted brake element (12) in order to exert a braking effect or clutch effect;
    at least two electric conductors (20, 22) each made of a different material that are directly embedded in the friction lining (14) and electrically insulated from each other solely by material forming said friction lining, said at least two electric conductors being electrically conductively connected to each other by physical contact with the brake element (12) in order to form a thermocouple when the brake element (12) is frictionally engaged with the at least one friction lining (14), said at least two electric conductors (20, 22) arranged in the friction lining (14) so as to wear together with the friction lining during operation of the brake or clutch; and
    an electric oscillating circuit coupled to the at least two electric conductors (20, 22) to measure the wear of the friction lining.

2. The device according to claim 1, characterized in that the at least two electric conductors (20, 22) run essentially parallel to each other inside the friction lining (14).

3. The device according to claim 1, characterized in that the at least two electric conductors (20, 22) run essentially parallel to the surface normal of the friction surface of the brake element (12).

4. The device according to claim 1, characterized in that the at least two electric conductors (20, 22) are flush with the friction surface of the friction lining (14).

5. The device according to claim 1, characterized in that, for purposes of measuring a three-dimensional temperature distribution, at least two pairs of electric conductors (20, 22) are installed in the friction lining with each pair at a different place inside the friction lining (14).

6. A brake system comprising:
two or more brake devices (30, 40, 60, 70) each having (a) at least one friction lining (14) frictionally engageable with a rotatably mounted brake element (12) in order to exert a braking effect or clutch effect, (b) at least two electric conductors (20, 22) that are made of different materials and that are directly embedded in the friction lining (14) and electrically insulated from each other solely by material forming the friction lining, with said at least two electric conductors being electrically conductively connected to each other by physical contact with the brake element (12) in order to form a thermocouple when the brake element (12) is frictionally engaged with the at least one friction lining (14), said at least two electric conductors (20, 22) arranged in the friction lining (14) so as to wear together with the friction lining during operation of the brake, and (c) an oscillating circuit coupled to the two electric conductors (20, 22) for measuring the wear of the friction lining (14) of at least one of said brake devices; and
at least one control unit (50) for detecting an operating state of the brake devices (30, 40, 60, 70) configured to individually adjust the braking parameters for at least one brake device (30, 40, 60, 70) as a function of the operating state ascertained for said at least one brake device.

7. The brake system according to claim 6, characterized in that the operating state of at least one of the two or more brake devices (30, 40, 60, 70) encompasses at least the temperature and/or the degree of wear of a friction lining (14) and/or of a brake element (12).

8. The brake system according to claim 6, characterized in that the control unit (50) is configured to regulate or to set a maximum braking pressure that can be applied and/or is configured to set an air space between the friction lining (14) and the brake element (12) of at least one brake device.

9. A method for controlling a brake system that includes multiple brake devices, comprising:
ascertaining the wear of at least one friction lining (14) of a first brake device (10; 30, 40, 60, 70) with a device for detecting temperature and wear of a brake that has at least two electric conductors (20, 22) that are each made of a different material and are directly embedded in the friction lining (14) and isolated from each other solely by material forming the friction lining (14) and electrically conductively connected to each other by physical contact with a brake element (12) in order to form a thermocouple, said at least two electric conductors (20, 22) arranged in the friction lining (14) so as to wear together with the friction lining during operation of the brake, wherein the wear of the friction lining (14) is measured with an oscillating circuit that can be coupled to the two electric conductors (20, 22),
ascertaining the temperature of the first brake device (10; 30, 40, 60, 70) with the device for detecting temperature and wear of a brake,
determining individual brake parameters for the first brake device (10; 30, 40, 60, 70) as a function of the parameters, namely, the wear and/or the temperature, ascertained for each brake device (10; 30, 40, 60, 70), and
activating or actuating the first brake device (10; 30, 40, 60, 70) as a function of the individual brake parameters determined for the first brake device (10; 30, 40, 60, 70).

10. The method of claim 9, wherein activating or actuating is by a control unit (50) configured to regulate or to set a maximum braking pressure that can be applied and/or to set an air space between the friction lining (14) and the brake element (12).

11. The method of claim 9, wherein activating or actuating is by a control unit (50) that transmits brake parameters to the brake devices (10; 30, 40, 60, 70) to distribute stress on the brake devices individually.

12. The device according to claim 1, wherein the brake element is a brake disc.

13. The device according to claim 1, characterized in that the at least two electric conductors (20, 22) run essentially parallel to each other inside the friction lining (14) but obliquely relative to a friction surface of the friction lining.

14. The brake system according to claim 6, wherein the brake element is a brake disc.

15. The method of claim 9, wherein the brake element is a brake disc.

* * * * *